United States Patent [19]

Ellegard

[11] Patent Number: 4,757,786
[45] Date of Patent: Jul. 19, 1988

[54] RELEASABLE ENGINE COUPLING ARRANGEMENT

[76] Inventor: Sidney W. Ellegard, 646 N. Noble St., Orange, Calif. 92669

[21] Appl. No.: 791,119

[22] Filed: Oct. 24, 1985

[51] Int. Cl.⁴ .............................................. F02B 63/00
[52] U.S. Cl. ................................ 123/2; 123/198 DC; 123/DIG. 6; 192/129 A; 192/103 B; 403/316; 403/348
[58] Field of Search ........... 192/103 B, 129 R, 129 A, 192/133; 74/16, 501 R; 123/2, DIG. 6, DIG. 7, 198 DC; 30/122, 500, 216, 228, 381, 383; 403/316, 348, 353; 173/29, 163; 261/41.4, 65; 241/37.5

[56] References Cited

U.S. PATENT DOCUMENTS

| | | | |
|---|---|---|---|
| 622,313 | 4/1899 | Woodvine | 285/82 |
| 1,790,584 | 1/1931 | Hirschy | 123/2 |
| 2,697,457 | 12/1954 | Lawrence | 30/228 |
| 2,785,424 | 3/1957 | McMaster et al. | 403/353 |
| 3,341,185 | 9/1967 | Kennedy, Sr. | 261/41.4 |
| 3,572,305 | 3/1971 | Moragne | 123/198 DC |
| 3,616,867 | 11/1971 | Celli | 173/163 |
| 3,949,817 | 4/1976 | Rice | 30/381 |
| 4,084,449 | 4/1978 | Kine | 74/489 |
| 4,132,296 | 1/1979 | Evett | 74/489 |
| 4,226,373 | 10/1980 | Williams | 241/37.5 |
| 4,245,713 | 1/1981 | Mochida et al. | 74/501 R |
| 4,250,125 | 2/1981 | Donovan | 261/41.4 |
| 4,350,123 | 9/1982 | Kossek et al. | 123/2 |
| 4,515,037 | 5/1985 | Block | 403/348 |
| 4,624,155 | 11/1986 | Wing | 74/501 R |

FOREIGN PATENT DOCUMENTS 833792 10/1938 France .................. 74/501 F
228604 2/1925 United Kingdom ........... 74/482

OTHER PUBLICATIONS

"Engine Snaps onto Choice of Implements", *Product Engineering*, Nov. 7, 1960, pp. 68,69.

*Primary Examiner*—Leslie A. Braun
*Assistant Examiner*—David A. Testardi
*Attorney, Agent, or Firm*—Bogucki, Scherlacher, Mok & Roth

[57] ABSTRACT

An arrangement for releasably coupling an engine to a driven device such as a power tool includes a lug-bearing ring mounted on the engine, the ring encircling a centrifugally operated clutch, splined shaft or other shaft coupling member at the end of a drive shaft and having a plurality of lugs with enlarged heads mounted thereon. The engine is releasably coupled to a driven device by passing the enlarged heads of the lugs through large portions of mating apertures within a lug-receiving ring mounted on the driven device and then rotating the engine relative to the driven device to move the lugs into necked-down portions of the apertures and lock one of the lug heads against a manually actuable resilient retainer strip mounted on the opposite side of the lug-receiving ring. A cable at the end of a manually operated engine speed control on the driven device is releasably coupled to the engine throttle control. A pressure-responsive electrical switch mounted on the engine grounds the ignition circuit of the engine to prevent operation thereof except when engaged by an element on the driven device when the driven device has been moved into a properly coupled position on the engine.

9 Claims, 6 Drawing Sheets

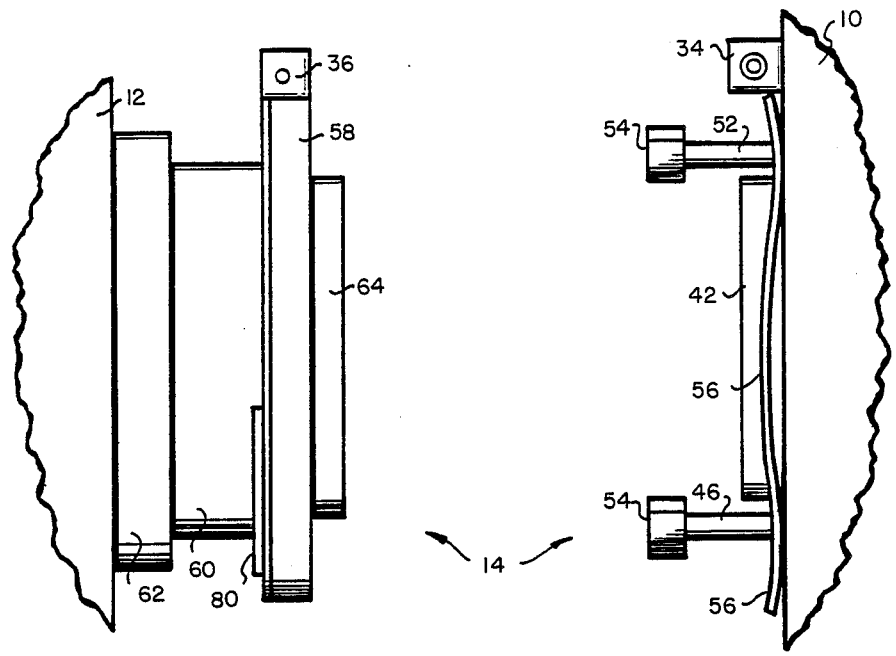
FIG. 6
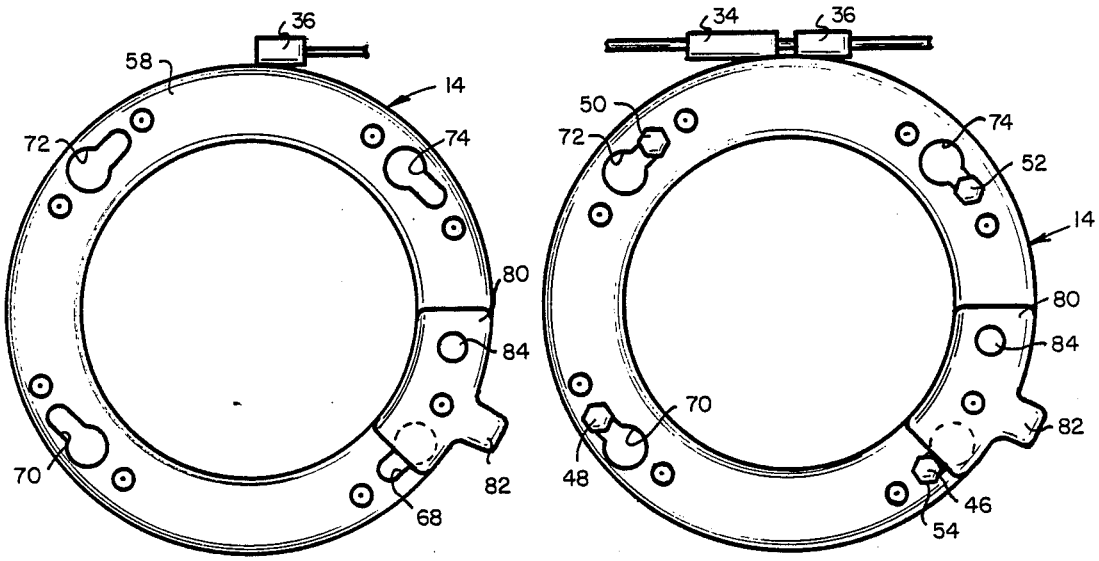
FIG. 7                    FIG. 8

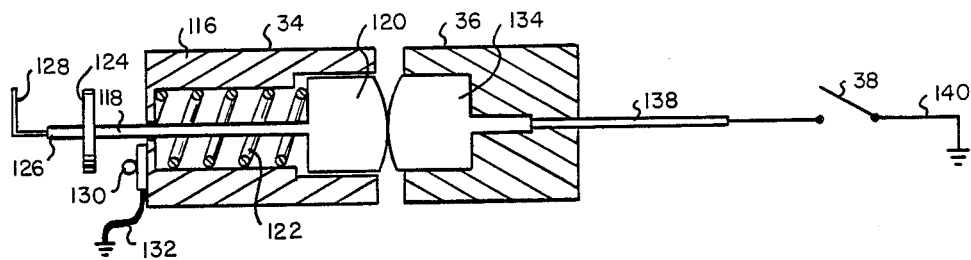
FIG. 9
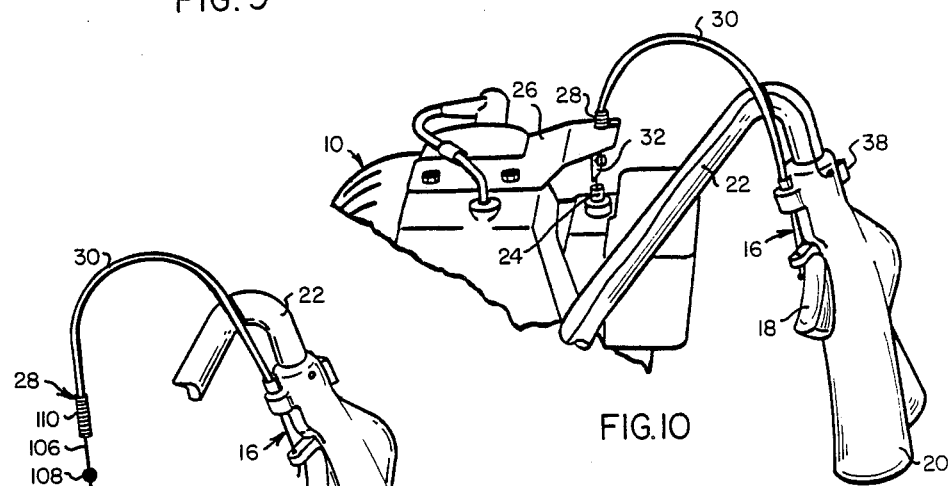
FIG. 10
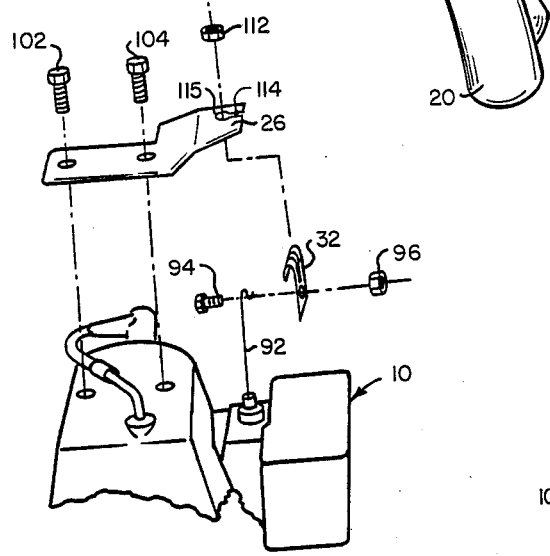
FIG. 11
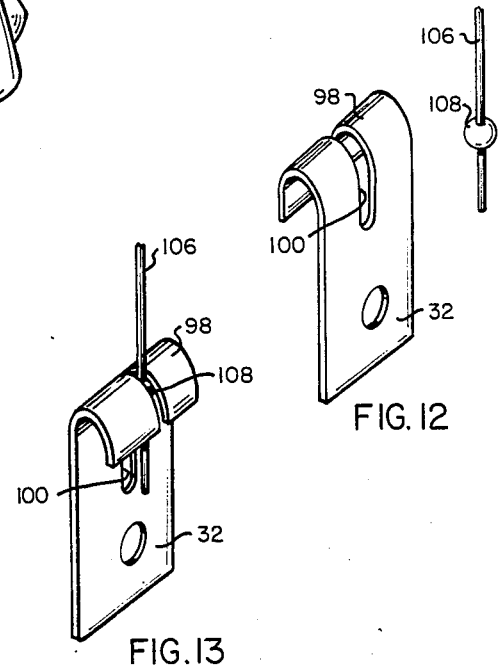
FIG. 12
FIG. 13

RELEASABLE ENGINE COUPLING ARRANGEMENT

BACKGROUND OF THE INVENTION

1. Field of the Invention

The present invention relates to arrangements for releasably coupling an engine to a driven device, so that the driven device need not have an engine permanently attached thereto and so that the engine may be used with other driven devices.

2. History of the Prior Art

There are many driven devices such as tools that are advantageously powered such as by a gasoline engine. Examples of such driven devices include weed eaters, hedge trimmers, blowers, pumps, drills, chain saws, circular saws, electrical generators, winches, posthole diggers, lawn edgers, lawn mowers, air compressors, outboard motors and wheeled vehicles such as go-carts and mopeds. Such devices are typically power driven by attaching a gasoline engine thereto so that the engine becomes a permanent part of the device. This is wasteful in that the engine may thereafter be used only with that particular tool or driven device and cannot be used with other devices. Aside from the obvious increase in cost of the driven device because of the necessary inclusion of an engine therewith, other disadvantages include the increased weight and size of the device because of the permanent presence of the engine. Thus, storage of such devices is made more difficult because of the increased storage space required by the separate gasoline engine permanently coupled to each such device.

Therefore, it would be advantageous to provide an arrangement which enables the releasable coupling of a driven device to a source of power such as a gasoline engine. In this manner, the engine could be coupled to the driven device when it is desired to use such driven device, then uncoupled from the driven device in preparation for the use of the engine with other driven devices. This would enable a single engine to be used with a variety of different power tools and other driven devices. Thus, it would be possible for a single engine to be used with various different power tools in a home workshop, for example, then taken outside and used with each of a plurality of different garden tools.

Various different types of coupling arrangements are known. Examples of certain existing coupling arrangements include U.S. Pat. No. 2,160,354 of Evans which relates to a flexible hose coupling that employs two rings in combination with lugs and mating apertures of varying width. Another example is provided by U.S. Pat. No. 904,200 of Harris which shows two sections of metal culvert joined together by a pair of rings, one of which has apertures of varying width therein and the other which has lugs mounted thereon. A further example is provided by U.S. Pat. No. 622,313 of Woodvine which relates to a standpipe coupling in which lugs on one ring mate with apertures of varying width on another ring. The surfaces adjacent the apertures are ramped to provide an increasingly tighter fit as the rings rotate relative to one another. Still further examples of conventional coupling arrangements are provided by U.S. Pat. Nos. 1,148,824 of Boje, Jr.; 2,819,028 of Brezosky et al; and 2,416,964 of Stull.

The various coupling arrangements described in the above-noted patents do not relate to the releasable coupling of an engine to a driven device and do not address the particular problems involved in such an arrangement. Thus, an arrangement for releasably coupling an engine to a driven device such as a power tool must be designed so as to rotatably couple the drive shaft of the engine to a driven shaft of the driven device. The releasable coupling arrangement must be strong, sturdy and capable of withstanding considerable force and stress, and yet at the same time must lend itself to quick coupling and uncoupling with relatively simple and limited motions that can be accomplished by hand and without the need for any tools.

In an arrangement for releasably coupling an engine to a power tool or other driven device, it is furthermore desirable that the engine be capable of manual control from the driven device itself. Thus, a manually operated engine speed control included within the driven device must be readily and releasably coupled to the engine when the engine is coupled to the driven device. The ability to control the speed of the engine from the driven device is advantageous, particularly where the driven device is relatively large and the engine itself is not located for convenient access by the operator of the driven device.

It would furthermore be desirable in cases where an engine is releasably coupled to a driven device to provide for automatic shut-off of the engine in the event that the driven device begins to uncouple from the engine, as well as to provide for quick engine shut-off from the driven device. This is a safety feature in that safety problems can arise if the engine starts to uncouple from the driven device while the driven device is being used. Also, the ability to quickly shut the engine off using a control located at the driven device is an advantageous safety feature.

BRIEF DESCRIPTION OF THE INVENTION

Releasable coupling arrangements in accordance with the invention provide for the releasable coupling of an engine to a driven device quickly, by hand, with a minimum of motion and effort and without the need for any tools. At the same time, the coupling provides a strong, sturdy and positive connection of the engine to the driven device so that relatively large power tools and other demanding devices can be driven using the releasable coupling arrangement. Provision is made for readily coupling a manually operated engine speed control on the driven device to the throttle control of the engine in releasable fashion. In addition, provision is made for automatic shut-off of the engine in the event that the driven device begins to uncouple from the engine. Quick engine shut-off can also be accomplished from the driven device.

In a preferred embodiment of a releasable coupling arrangement in accordance with the invention, the engine is provided with a lug-bearing ring thereon which encircles the engine drive shaft. A plurality of lugs having enlarged heads are mounted in spaced-apart relation around the lug-bearing ring of the engine, and a spring plate made of resilient material and assuming a slightly non-planar configuration is disposed so as to extend around the lug-bearing ring. The driven device is provided with a lug-receiving ring having a plurality of spaced-apart apertures therein of varying width for receiving the lugs mounted on the lug-bearing ring of the engine. Each of the apertures has a width which varies in a circumferential direction from a maximum width that is large enough to receive the enlarged head of one of the lugs to a minimum width where the lug becomes secured and confined therein.

Coupling of the engine to the driven device is easily and simply accomplished by inserting the enlarged heads of the lugs through the portions of maximum width of the apertures and then rotating the engine relative to the driven device so as to seat the lugs within the portions of minimum width of the apertures. A tight and positive fit between the lug-bearing ring of the engine and the lug-receiving ring of the driven device is provided by the ring-shaped spring plate on the lug-bearing ring of the engine. The spring plate extends outwardly and exerts pressure on the lug-receiving ring of the driven device as the lugs are moved into the minimum width portions of the apertures. The engine is locked into the coupled position relative to the driven device by a resilient retainer strip mounted on the back of the lug-receiving ring opposite the lug-bearing ring of the engine. The resilient retainer strip which is mounted adjacent one of the apertures drops to the side of the enlarged head of a lug positioned within the aperture when the lug is moved into the minimum width portion of the aperture.

The circumferential direction in which the apertures vary from maximum width to minimum width is determined by the direction of engine rotation, and is chosen to be opposite the direction of engine rotation. The resulting counterrotational torque forces the lugs to seat in the regions of minimum width of the apertures to assure constant locking between the engine and the driven load.

With the engine so coupled to the driven device, the drive shaft of the engine is coupled to the driven shaft of the driven device. In one arrangement the coupling is accomplished by a clutch arrangement which includes a centrifugally operated clutch mounted on the drive shaft of the engine. As the drive shaft of the engine begins to rotate, portions of the centrifugally operated clutch mounted thereon expand outwardly and into engagement with the inner surface of a clutch cup coupled to the driven shaft of the driven device and disposed within the lug-receiving ring. In an alternative arrangement coupling is accomplished by fashioning one of the drive and driven shafts as a spline shaft which fits within a mating splined aperture in the other one of the shafts. The spline shaft is inserted in the splined aperture as the engine is coupled to the driven device by insertion of the lugs into the apertures.

When the engine is coupled to the driven device by the releasable coupling arrangement just described, a manually operated engine speed control on the driven device is coupled to a throttle control for the engine. In one releasable arrangement for accomplishing this, a bracket attached to a cable forming a part of the engine throttle control is utilized. The manually operated engine speed control includes a length of cable within a sheath having a fitting at the end thereof so that the fitting can be readily installed on a mounting plate on the engine. An end of the cable protruding from the sheath has a bead or other protuberance thereon which is placed within a curved end of the bracket, following which the bracket and included cable of the engine throttle control are pulled out against the resistance of the carburetor valve return spring to allow the fitting to be installed on the mounting plate. In an alternative carburetor arrangement in which a slotted post is mounted on the outer end of a pivotally mounted throttle connecting bar, the bead and cable are placed within the slot in the post and the connecting bar is thereafter rotated against the resistance of the carburetor valve return spring far enough to seat the fitting in a bracket formed at the top of the carburetor.

The engine is provided with a pressure-responsive electrical switch mounted on the lug-bearing ring. An electrical lead from the ignition circuit of the engine is coupled to a conductive plunger that is slidably mounted within a housing of the electrical switch. The plunger has a conductive element mounted thereon adjacent an electrically grounded contact on the side of the housing. A spring which encircles the conductive plunger within the housing normally urges the plunger in a direction to move the conductive element against the contact and thereby short the engine to ground. However, when the engine is properly coupled to the driven device, a switch-engaging element mounted at the top of the lug-receiving ring on the driven device engages the conductive plunger of the pressure-responsive electrical switch and moves the plunger against the resistance of the spring so as to hold the conductive element away from the contact, thereby enabling the engine to operate. Should the engine begin to rotate out of the desired coupled position relative to the driven device, the resulting movement of the switch-engaging element away from the pressure-responsive electrical switch allows the conductive plunger to move in response to the urging of the spring so that the conductive element mounted on the plunger moves against the contact at the side of the housing to short out the engine ignition circuit and thereby stop the engine.

Shut-off of the engine from the driven device is also provided for by the design of the switch-engaging element mounted at the top of the lug-receiving ring which has a conductive rod mounted within a housing. With the engine properly coupled to the driven device, the conductive rod within the housing moves the conductive plunger of the pressure-responsive electrical switch against the urging of the spring, and at the same time makes electrical contact with the ignition circuit of the engine via the conductive plunger. The conductive rod in turn is coupled to electrical ground through a push-button or toggle switch mounted on the driven device. Should the operator of the driven device decide to shut off the engine, he need only momentarily depress the push-button switch or flip the toggle switch. This momentarily couples the engine circuit to ground through the conductive plunger of the pressure-responsive electrical switch and the conductive rod of the switch-engaging element.

Release of the engine from the driven device is initiated by uncoupling the manually operated speed control on the driven device from the throttle control of the engine. The engine throttle control is pulled against the resistance of the carburetor valve return spring far enough to allow the fitting to be unseated from the bracket. The bead is then removed from the slotted bracket or the slotted post depending on the type of carburetor involved.

Following the uncoupling of the manually operated speed control from the throttle control of the engine a tab on the resilient retainer strip mounted at the back of the lug-receiving ring is manually actuated so as to move the retainer strip out of the way of the adjacent lug head. With the retainer strip held away from the lug head in this fashion, the engine is rotated relative to the driven device so as to rotate the lugs into the portions of the apertures having the maximum width which is larger than the lug heads. With the engine in this position relative to the driven device, the enlarged lug heads are simply pulled through the apertures to separate the engine from the driven device.

BRIEF DESCRIPTION OF THE DRAWINGS

The foregoing and other objects, features and advantages of the invention will be apparent from the following more particular description of preferred embodiments of the invention, as illustrated in the accompanying drawings, in which:

FIG. 6 is a side view of the releasable coupling arrangement showing the portion thereof which is mounted on the engine separated from the portion thereof which is mounted on the hedge trimmer;

FIG. 7 is a rear view of the lug-receiving ring of the portion of the releasable coupling arrangement mounted on the hedge trimmer;

FIG. 8 is a view similar to FIG. 7 but with the engine coupled to the hedge trimmer so that lugs mounted on the engine are shown seated within apertures in the lug-receiving ring;

FIG. 9 is a sectional view of a pressure-responsive electrical switch and a mating switch-engaging element for providing shut-off of the engine from the hedge trimmer upon command or in the event of an unwanted uncoupling of the engine from the hedge trimmer;

FIG. 10 is a perspective view of portions of the engine and hedge trimmer showing the manner in which a manually operated engine speed control on the hedge trimmer is releasably coupled to a throttle control of the engine;

FIG. 11 is a view similar to FIG. 10 but in exploded form so as to illustrate the various parts thereof;

FIG. 12 is a perspective view of a bracket and mating cable with attached bead employed in the arrangement of FIGS. 10 and 11;

FIG. 13 is a perspective view similar to FIG. 12 but with the bracket turned around and the cable and included bead installed therein;

DETAILED DESCRIPTION OF THE INVENTION

Figure 1:
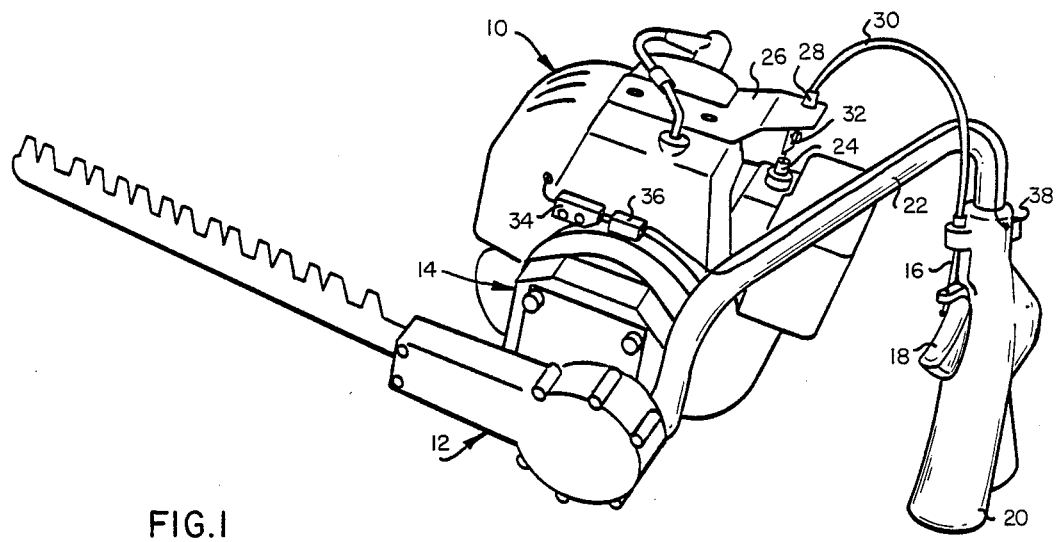
FIG. 1 is a perspective view of an engine coupled to a hedge trimmer by a releasable coupling arrangement in accordance with the invention.

FIG. 1 shows an engine 10 joined to a hedge trimmer 12 by a releasable coupling arrangement 14 in accordance with the invention. As described hereafter, the releasable coupling arrangement 14 enables the engine 10 to be readily and easily coupled to the hedge trimmer 12 so as to power the hedge trimmer 12. Coupling and uncoupling of the engine 10 relative to the hedge trimmer 12 is accomplished manually and without the need for tools.

The hedge trimmer 12 is shown in FIG. 1 and hereafter as an example of a driven device to which the engine 10 can be releasably coupled using the arrangement 14. However, it should be understood that the coupling arrangement 14 can be used to provide releasable coupling of the engine 10 to various other driven devices including such things as weed eaters, blowers, pumps, drills, chain saws, circular saws, electrical generators, winches, posthole diggers, lawn edgers, lawn mowers, air compressors, outboard motors, go-carts and mopeds.

The hedge trimmer 12 is provided with a manually operated engine speed control 16 in the form of a button 18 formed within a handle 20. The handle 20 is coupled to the main part of the hedge trimmer 12 by a bar 22. As described in detail hereafter, the manually operated engine speed control 16 is coupled to a throttle control 24 for the engine 10 by an arrangement that provides for quick connection and disconnection therebetween. Such an arrangement includes a mounting plate 26 mounted on the engine 10 and adapted to receive a fitting 28 at the end of a cable sheath 30 opposite the button 18 so that a cable within the sheath 30 can be attached to a bracket 32 forming a part of the throttle control 24 for the engine 10.

As also described in greater detail hereafter, the releasable coupling arrangement 14 includes a pressure-responsive electrical switch 34 mounted on the engine 10 and electrically coupled to the ignition circuit of the engine 10. When the engine 10 is properly coupled to the hedge trimmer 12, the pressure-responsive electrical switch 34 is engaged by a switch-engaging element 36 mounted on the hedge trimmer 12 and this holds open a circuit between the ignition of the engine 10 and electrical ground. However, if the engine 10 begins to rotate relative to the hedge trimmer 12 so as to begin uncoupling the engine 10 from the hedge trimmer 12, the switch-engaging element 36 moves away from the pressure-responsive switch 34. The switch 34 responds by shorting out the ignition of the engine 10 to stop the engine 10.

The engine 10 can also be shorted out and thereby stopped using a switch 38 mounted on the hedge trimmer 12 at the handle 20. As described in detail hereafter, momentary closure of the switch 38 by the operator shorts out the ignition circuit of the engine 10 through the pressure-responsive electrical switch 34 and the element 36.

Figure 2:
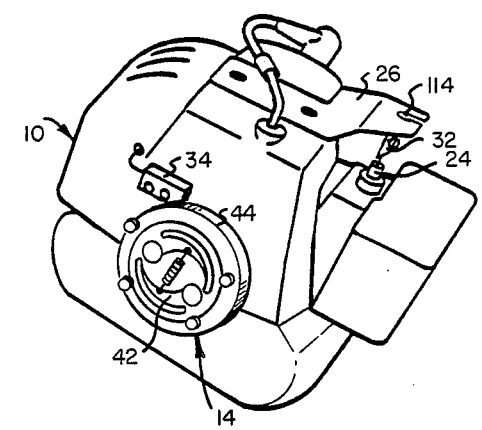
FIG. 2 is a perspective view of the engine showing a portion of the releasable coupling arrangement mounted thereon.
Figure 4:
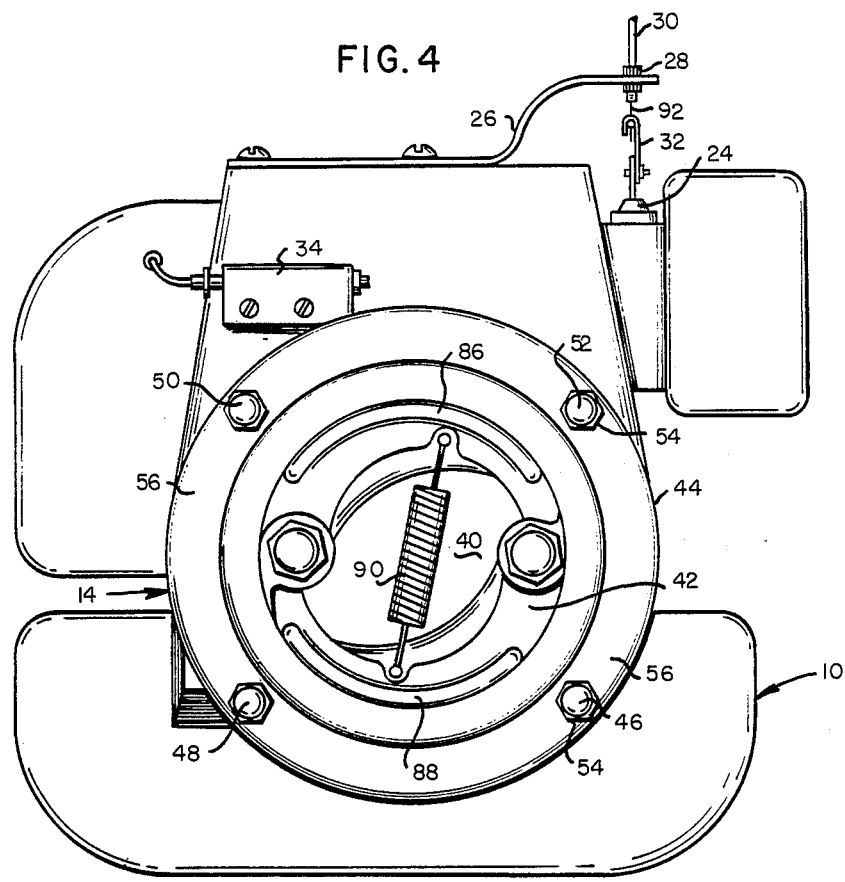
FIG. 4 is a front view of the portion of the releasable coupling arrangement mounted on the engine and showing a centrifugal clutch for coupling the drive shaft of the engine to the driven shaft of the hedge trimmer.

The portion of the releasable coupling arrangement 14 which is mounted on the engine 10 is shown in FIGS. 2 and 4. The engine 10 includes a drive shaft 40 having a centrifugal clutch 42 mounted on the outer end thereof. The centrifugal clutch 42 is disposed within a lug-bearing ring 44. The lug-bearing ring 44 which is mounted on the frame of the engine 10 has four different lugs 46, 48, 50 and 52 mounted thereon so as to be generally equidistantly spaced about the circumference of the ring 44. Each of the lugs 46, 48, 50 and 52 extends outwardly from the lug-bearing ring 44 and terminates in an enlarged head 54. The enlarged head 54 of each lug is disposed by generally fixed distance from the lug-bearing ring 44.

As shown in FIGS. 4 and 6, the portion of the releasable coupling arrangement 14 which is mounted on the engine 10 also includes a ring-shaped spring plate 56 which extends around and is generally coextensive with the lug-bearing ring 44. The spring plate 56 is made of resilient material and is slightly non-planar in configuration to the extent that portions thereof between the lugs 46, 48, 50 and 52 extend outwardly by a relatively small distance from the lug-bearing ring 44.

Figure 5:
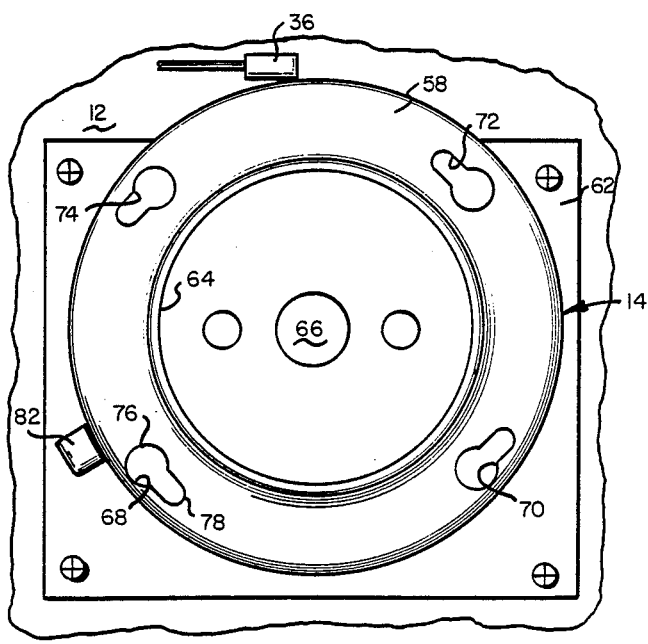
FIG. 5 is a front view of the portion of the releasable coupling arrangement mounted on the hedge trimmer and showing the mating cup which couples the output of the engine to the driven shaft of the hedge trimmer.

The portions of the releasable coupling arrangement 14 which are mounted on the hedge trimmer 12 are shown in FIGS. 5 and 6 and include a lug-receiving ring 58 joined to the hedge trimmer 12 by a hollow cylindrical collar 60 extending between the lug-receiving ring 58 and a plate 62 which is secured to the hedge trimmer 12. A hollow, generally cylindrical clutch cup 64 is coupled to the end of a driven shaft 66 within the hedge trimmer 12 so as to be rotatably disposed within the lug-receiving ring 58 and the hollow cylindrical collar 60.

The lug-receiving ring 58 is provided with four different apertures 68, 70, 72 and 74 which are generally equidistantly spaced around the circumference thereof. Each of the apertures 68, 70, 72 and 74 has a variable width which decreases from a maximum to a minimum in the same direction around the lug-receiving ring 58. Such direction which is clockwise as viewed in FIG. 5 is determined by the direction of rotation of the drive shaft 40. The direction of rotation of the drive shaft 40 is opposite that in which the apertures 68, 70, 72 and 74 decrease in size so as to be counterclockwise as viewed in FIG. 5. This results in a counter rotational torque upon operation of the engine 10 which forces the lugs 46, 48, 50 and 52 to seat in the smaller portions of the apertures 68, 70, 72 and 74 to encourage the engine 10 to remain coupled to the hedge trimmer 12.

Thus, each of the apertures 68, 70, 72 and 74 has a portion 76 thereof of maximum width which is large enough to freely receive the enlarged head 54 of one of the lugs 46, 48, 50 and 52 therein. Each of the apertures 68, 70, 72 and 74 also has a necked-down portion 78 of minimum width which is large enough to accommodate one of the lugs 46, 48, 50 and 52 but at the same time is considerably smaller than the enlarged heads 54 of the lugs.

Coupling of the engine 10 to the hedge trimmer 12 is accomplished by inserting the enlarged head 54 of each of the lugs 46, 48, 50 and 52 into the portion of maximum width 76 of a different one of the apertures 68, 70, 72 and 74. The enlarged heads 54 of the lugs 46, 48, 50 and 52 extend outwardly from the lug-bearing ring 44 by a uniform distance which is just large enough to enable the enlarged heads 54 to completely pass through the apertures 68, 70, 72 and 74 with the ring-shaped spring plate 56 partly flattened by the application of pressure. If the engine 10 is then rotated relative to the hedge trimmer 12, the lugs 46, 48, 50 and 52 are moved into the portions of minimum width 78 of the apertures 68, 70, 72 and 74 with the enlarged heads 54 of the lugs positioned against the back side of the lug-receiving ring 58. FIG. 7 is a view of the back side of the lug-receiving ring 58 with the engine 10 uncoupled from the hedge trimmer 12. FIG. 8 is the same view but after the various lugs 46, 48, 50 and 52 have been inserted through the apertures 68, 70, 72 and 74 and the engine 10 then rotated relative to the hedge trimmer 12 to position the enlarged heads 54 of the lugs against the back of the lug-receiving ring 58 at the portions of minimum width 78 of the apertures.

FIGS. 7 and 8 also illustrate a resilient retainer strip 80 which is mounted on the back side of the lug-receiving ring 58 and which has a manually actuable tab 82 at one side thereof which extends to the outside of the lug-receiving ring 58. The manually actuable tab 82 is also visible in FIG. 5. The resilient retainer strip 80 is coupled at the upper end thereof to the lug-receiving ring 58 by a bolt 84. This allows the lower portion of the resilient retainer strip 80 which extends over the portion of maximum width 76 of the aperture 68 to flex outwardly and away from the lug-receiving ring 58 and the aperture 68.

When coupling of the engine 10 to the hedge trimmer 12 is initiated by inserting the lugs 46, 48, 50 and 52 into the apertures 68, 70, 72 and 74 respectively, the lug 46 extends through the aperture 68 and the enlarged head 54 thereof bears against and pushes the lower portion of the resilient retainer strip 80 outwardly and away from the lug-receiving ring 58 by a distance great enough to permit the enlarged head 54 of the lug 46 to clear the aperture 68. When the engine 10 is then rotated relative to the hedge trimmer 12, the enlarged head 54 of the lug 46 slides along the lower portion of the resilient retainer strip 80. When the enlarged head 54 of the lug 46 eventually clears the lower edge of the resilient retainer strip 80 so as to assume the position shown in FIG. 8, the retainer strip 80 snaps back into contact with the rear surface of the lug-receiving ring 54. With the lower edge of the resilient retainer strip 80 thus positioned at the side of the enlarged head 54 of the lug 46, the lug 46 and thereby the engine 10 is locked in the coupled position with the hedge trimmer 12.

With the engine 10 coupled to the hedge trimmer 12 in the manner described, the ring-shaped spring plate 56 which is partly compressed bears against the lug-receiving ring 58 so as to maintain a relatively snug and tensioned fit between the engine 10 and the hedge trimmer 12. At the same time, the resilient retainer strip 80 bears against the enlarged head 54 of the lug 46 so as to maintain the coupled relationship.

To release the engine 10 from the hedge trimmer 12, the manually actuable tab 82 of the resilient retainer strip 80 is pushed away from the rear surface of the lug-receiving ring 58 far enough to clear the enlarged head 54 of the lug 46. With the resilient retainer strip 80 held in this position, the engine 10 is rotated relative to the hedge trimmer 12 so as to move the lugs 46, 48, 50 and 52 to the portions of maximum width 76 of the apertures 68, 70, 72 and 74. The enlarged heads 54 of the lugs 46, 48, 50 and 52 may then be pulled through the portions of maximum width 76 of the apertures 68, 70, 72 and 74 so as to uncouple the engine 10 from the hedge trimmer 12.

As previously noted, the centrifugal clutch 42 is mounted on the outer end of the drive shaft 40 of the engine 10. The centrifugal clutch 42 includes a pair of opposite curved pads 86 and 88 which are pulled inwardly and toward one another by a spring 90 coupled thereto and extending therebetween. When the engine 10 is coupled to the hedge trimmer 12 and the engine 10 is started, spring tension initially holds the clutch pads 86 and 88 in. As the speed of the engine 10 is raised above an idle, rotation of the drive shaft 40 and the included centrifugal clutch 42 causes the curved pads 86 and 88 to move outwardly against the resistance of the spring 90 until they rub and then engage the inner walls of the clutch cup 64. In this manner power from the engine 10 is transmitted to the hedge trimmer 12. When the speed of the engine 10 is reduced to an idle or the engine 10 is turned off, the spring 90 overcomes the centrifugal force so as to return the curved pads 86 and 88 to an inward position in which they disengage from the inner wall of the clutch cup and thereby uncouple the drive shaft 40 of the engine 10 from the driven shaft 66 of the hedge trimmer 12.

Figure 3:
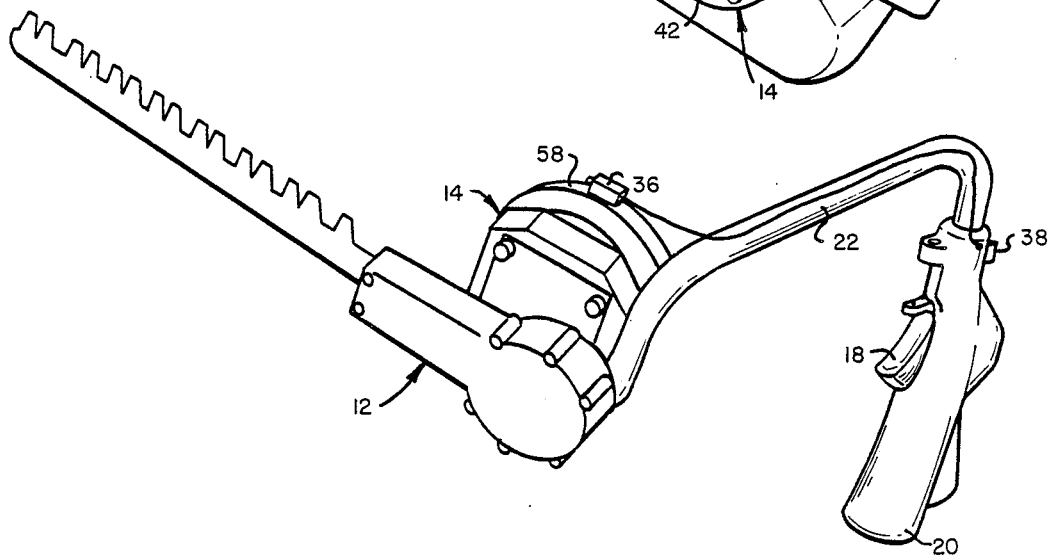
FIG. 3 is a perspective view of the hedge trimmer.

As previously noted in connection with FIGS. 1-3, the engine 10 has the throttle control 24 and the hedge trimmer 12 has the manually operated engine speed control 16 which is coupled to the throttle control 24 when the engine 10 is coupled to the hedge trimmer 12. The engine 10 includes the mounting plate 26, the throttle control 24 includes the bracket 32, and the manually operated engine speed control 16 includes the button 18, the fitting 28 and the cable sheath 30. These devices are shown in greater detail in FIGS. 10-15 to which reference is now made.

The throttle control 24 includes a cable 92 which is coupled to the carburetor valve within the engine 10 and which is normally tensioned or pulled in a direction toward the engine 10 by the carburetor valve return spring. The cable 92 is adapted for releasable coupling to the manually operated engine speed control 16 by an arrangement which includes the bracket 32. The bracket 32 is coupled to an end of the cable 92 by a bolt 94 and a nut 96 in the present example, but can be brazed or welded to the cable where desired. The bracket 32 has a curved upper end 98 having a central slot 100 therein. The bracket 32 and the cable 92 form a part of and remain with the engine 10, as does the mounting plate 26 which is secured to the top of the engine 10 by a pair of bolts 102 and 104 as shown in FIG. 10.

The manually operated engine speed control 16 includes the cable sheath 30 which extends from a region at the end of the handle 20 to the fitting 28 and which houses a length of cable 106 therein. One end of the cable 106 is attached to the pivotally mounted button 18 in the handle 20. The opposite end of the cable 106 extends outside of the opposite end of the cable sheath 30 beyond the fitting 28 and has a protuberance in the form of a metal bead 108 formed thereon. The fitting 28 includes a threaded collar 110 attached to the end of the cable sheath 30 and receiving a self-locking nut 112 thereon. With the self-locking nut 112 threaded onto the lower end of the collar 110, the fitting 28 and the included end of the cable sheath 30 are easily mounted on the plate 26 by inserting the threaded collar 110 through a slot 114 and into an aperture 115 in the mounting plate 26.

Figure 14:
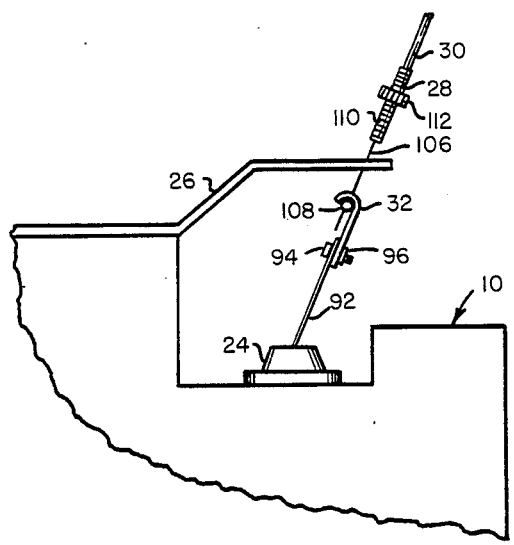
FIG. 14 is a side view of the arrangement of FIGS. 10 and 11 illustrating the coupling of the manually operated engine speed control of the hedge trimmer to the throttle control of the engine.
Figure 15:
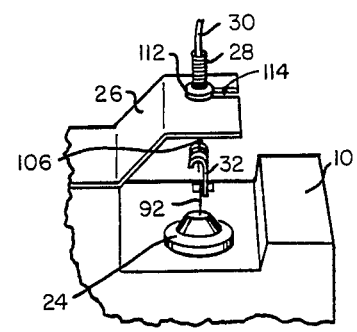
FIG. 15 is a perspective view of the arrangement of FIGS. 10 and 11 showing the manually operated engine speed control of the hedge trimmer coupled to the throttle control of the engine.

When the engine 10 is coupled to the hedge trimmer 12, the manually operated engine speed control 16 is easily and releasably coupled to the throttle control 24 of the engine 10 by first inserting the cable 106 above the metal bead 108 into the central slot 100 of the bracket and pulling on the cable 106 to seat the metal bead 108 within the curved upper end 98 of the bracket 32. The cable 92 is then pulled out against the resistance of the carburetor valve return spring far enough to permit insertion of the cable 106 in the slot 114 with the threaded collar 110 and the self-locking nut 112 above the bracket 26 opposite the engine 10 as shown in FIG. 14. When the cable 106 reaches the aperture 115, the tension of the carburetor valve return spring is permitted to pull the threaded collar 110 into the aperture 115 and seat the self-locking nut 112 on the bracket 26. Thereafter, the tension of the carburetor valve return spring holds the fitting 28 consisting of the threaded collar 110 and the self-locking nut 112 in place in the aperture 115 of the bracket 26 as shown in FIGS. 10 and 15. The self-locking nut 112 is moved up or down on the threaded collar 110 as necessary to insure that the metal bead 108 is snugly positioned within the curved upper end 98 of the bracket 32.

Thereafter, the speed of the engine 10 is controlled manually at the handle 20 by manipulation of the pivotally mounted button 18 which is coupled to the cable 106 and which thereby varies the tension on the cable 92 coupled to the throttle control 24.

When the engine 10 is to be uncoupled from the hedge trimmer 12, the manually operated engine speed control 16 is uncoupled from the throttle control 24 by grasping the cable sheath 30 just above the fitting 28 and pulling upwardly against the resistance of the carburetor valve return spring until the threaded collar 110 is pulled out of and clears the aperture 115 in the bracket 26. The cable 106 is then moved through the slot 114 to remove the fitting 28 from the bracket 26. With the fitting 28 clear of the bracket 26, the tension is relaxed, allowing the cable 92 to withdraw under the urging of the carburetor valve return spring. The cable 106 and the metal bead 108 are then removed from the bracket 32 by unseating the metal bead 108 from the curved upper end 98 of the bracket 32 and pulling the cable 106 through the central slot 100 and free of the bracket 32.

As previously noted, the pressure-responsive electrical switch 34 and the switch-engaging element 36 which are mounted on the engine 10 and the hedge trimmer 12 respectively act to cut off the engine 10 in the event that the engine 10 begins to uncouple from the hedge trimmer 12. The pressure-responsive electrical switch 34 and the switch-engaging element 36 can also be used to cut off the engine 10 using the switch 38 on the handle 20. The pressure-responsive electrical switch 34 and the switch-engaging element 36 are shown in detail in FIG. 9.

As seen in FIG. 9, the pressure-responsive electrical switch 34 includes a housing 116 mounted on the engine 10 at the top of the lug-bearing ring 44. Slidably mounted within the housing 116 is a conductive plunger 118 having an enlarged end 120 thereof. A coil spring 122 disposed within the housing 116 and encircling the conductive plunger 118 bears against the enlarged end 120 so as to normally urge the plunger 118 in a direction to the right as viewed in FIG. 9. A conductive element in the form of a washer 124 is mounted on the conductive plunger 118 outside of the housing 116 and adjacent an end 126 of the plunger 118 that is electrically coupled via a wire 128 to the ignition circuit of the engine 10. A small electrical contact 130 mounted on the outside of the housing 116 adjacent the conductive washer 124 is electrically coupled to ground via a wire 132.

The switch engaging element 36 is shown in contact with the pressure-responsive electrical switch 34 in FIG. 9. When the element 36 and the switch 34 are not in contact and there is no pressure on the conductive plunger 118, the coil spring 122 urges the plunger 118 in a direction toward the right as viewed in FIG. 9 so as to move the conductive washer 124 against the electrical contact 130. This completes an electrical circuit between the ignition circuit of the engine 10 and ground via the wire 128, the conductive washer 124, the electrical contact 130 and the wire 132. This action combines with the switch-engaging element 36 to cut off the engine 10 in the event the engine 10 begins to uncouple from the hedge trimmer 12. With the engine 10 in the properly coupled position on the hedge trimmer 12, a conductive rod 134 mounted within a housing 136 which in turn is mounted on the outer edge of the lug-receiving ring 58 pushes the conductive plunger 118 to the left against the resistance of the coil spring 122 so that the conductive washer 124 remains apart from the electrical contact 130. If now the engine 10 should begin to separate from the hedge trimmer 12 by rotating in a direction relative to the hedge trimmer 12 so as to move the switch-engaging element 36 away from the pressure-responsive electrical switch 34 (to the right as viewed in FIG. 9), then the coil spring 122 reacts by pushing the conductive plunger 118 to the right so that the conductive washer 124 moves against the electrical contact 130 to short out the engine 10.

The pressure-responsive electrical switch 34 and the switch-engaging element 36 also function in conjunction with the switch 38 on the handle 20 to provide cut-off of the engine 10 when the operator of the hedge trimmer 12 so desires. The conductive rod 134 within the housing 136 of the switch-engaging element 36 is coupled via a wire 138 to the switch 38. The switch 38 is also coupled via a wire 140 to electrical ground. The switch 38 may be of either the push-button or the toggle variety. When the operator closes the switch 38 at the handle 20, the conductive rod 134 within the housing 136 is coupled to ground via the wires 138 and 140. Assuming that the engine 10 is properly coupled to the hedge trimmer 12, the conductive rod 134 is in contact with the conductive plunger 118 and this grounds the wire 128 and thereby the ignition circuit of the engine 10.

The releasable coupling arrangement 14 has thus far been described in connection with a centrifugal clutch arrangement for coupling the drive shaft 40 of the engine 10 to the driven shaft 66 of the hedge trimmer 12. Such arrangement includes the centrifugal clutch 42 coupled to the drive shaft 40 of the engine 10 and the clutch cup 64 coupled to the driven shaft 66 of the hedge trimmer 12. However, it should be understood that other arrangements for coupling the drive shaft 40 to the driven shaft 66 can be used with the releasable coupling arrangement 14.

Figure 16:
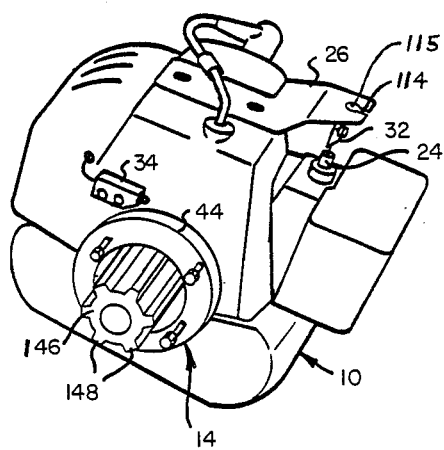
FIG. 16 is a perspective view of the engine similar to FIG. 2 but showing a splined shaft arrangement for coupling the drive shaft of the engine to the driven shaft of the hedge trimmer.
Figure 17:
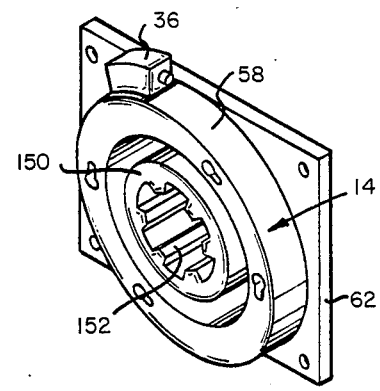
FIG. 17 is a perspective view of the portion of the releasable coupling arrangement which is mounted on the hedge trimmer and is adapted to receive the splined shaft of the arrangement of FIG. 16.
Figure 18:
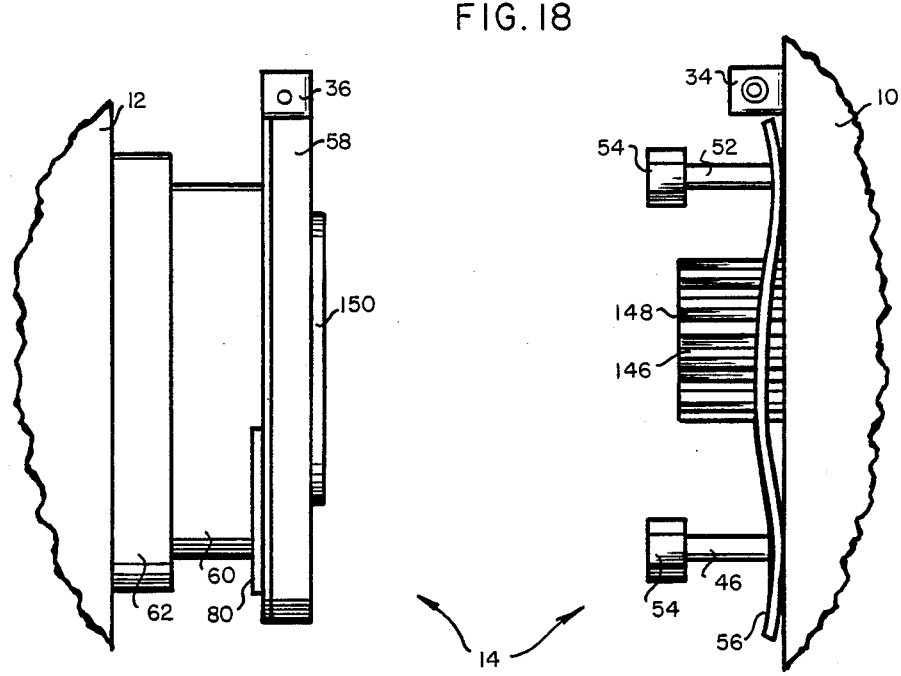
FIG. 18 is a side view of the releasable coupling arrangement similar to FIG. 6 but showing the splined shaft arrangement of FIGS. 16 and 17, for coupling the drive shaft of the engine to the driven shaft of the hedge trimmer.

An alternative arrangement for coupling the drive shaft 40 of the engine 10 to the driven shaft 66 of the hedge trimmer 12 in conjunction with the releasable coupling arrangement 14 is illustrated in FIGS. 16–18. In the arrangement of FIGS. 16–18, the drive shaft 40 of the engine 10 terminates in a splined shaft 146 which extends outwardly from the lug-bearing ring 44. The splined shaft 146 has a plurality of spaced-apart splines 148 extending along the length thereof. As shown in FIG. 17, the driven shaft 66 (not shown) of the hedge trimmer 12 terminates in a shaft 150 disposed within the lug-receiving ring 58. The shaft 150 has a splined aperture 152 therein which is slightly larger than and configured to receive the splined shaft 146 therein.

In the arrangement of FIGS. 16–18 the splined shaft 146 of the engine 10 is inserted into the splined aperture 152 of the shaft 150 when the engine 10 is coupled to the hedge trimmer 12. Thereafter, coupling of the engine 10 to the hedge trimmer 12 is carried out in the manner previously described with the lugs 46, 48, 50 and 52 of the lug-bearing ring 44 being inserted in the apertures 68, 70, 72 and 74 respectively of the lug-receiving ring 58 and the engine 10 then being rotated relative to the hedge trimmer 12 to seat the various lugs within the portions of minimum width 78 of the apertures.

When uncoupling the engine 10 from the hedge trimmer 12, the engine 10 is rotated relative to the hedge trimmer 12 following outward movement of the resilient retainer strip 80 so as to position the lugs 46, 48, 50 and 52 at the portions of maximum width 76 of the apertures 68, 70, 72 and 74 respectively. The enlarged heads 54 of the lugs 46, 48, 50 and 52 are then pulled through the apertures 68, 70, 72 and 74 while at the same time the splined shaft 146 is withdrawn from the splined aperture 152 of the shaft 150.

It should be understood that the splined shaft arrangement of FIGS. 16–18 could be reversed, if desired, with the apertured shaft 150 being coupled to the drive shaft 40 of the engine 10 and the splined shaft 146 being coupled to the driven shaft 66 of the hedge trimmer 12.

Figure 19:
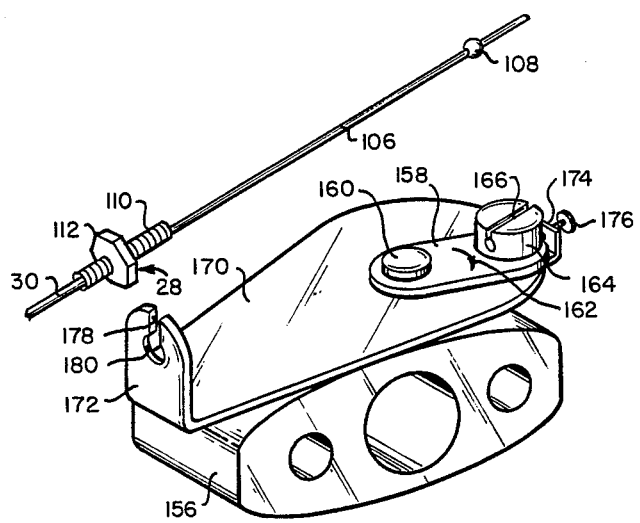
FIG. 19 is a perspective view of portions of the engine and hedge trimmer showing a different carburetor arrangement and an alternative arrangement used therewith for releasably coupling the manually operated engine speed control on the hedge trimmer to the throttle control of the engine.
Figure 20:
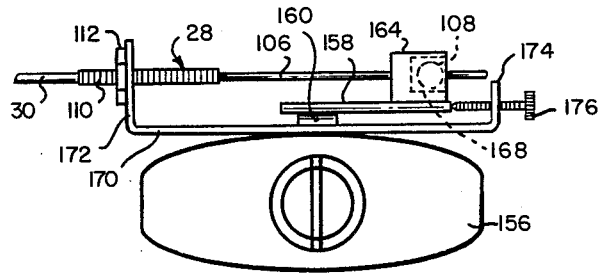
FIG. 20 is a side view of the arrangement of FIG. 19 with the manually operated engine speed control coupled to the throttle control.

The manually operated engine speed control 16 has thus far been described in conjunction with a throttle control 24 on the engine 10 which is of the type having a cable 92 emanating therefrom. However, the manually operated engine speed control 16, either in the form shown and described or as slightly altered, can be used with other engine and carburetor configurations in accordance with the invention. An example of this is provided by FIGS. 19 and 20 which show a carburetor 156 which is of the type having a pivotally mounted throttle connecting bar 158. The throttle connecting bar 158 rotates on a shaft 160 in a direction shown by an arrow 162 in FIG. 19 against the resistance of an internally mounted carburetor valve return spring. A post 164 is rotatably mounted on the throttle connecting bar 158 at an outer end of the bar opposite the shaft 160. The post 164 is provided with a slot 166 extending through a central portion of the post 164 and communicating with a generally cylindrical aperture 168 extending into the post 164 from the side thereof. The cylindrical aperture 168 is shown in dotted outline in FIG. 20.

A thin plate 170 disposed between the top of the carburetor 156 and the throttle connecting bar 158 has an upturned end thereof forming a bracket 172 opposite the throttle connecting bar 158. An opposite upturned end 174 of the plate 170 mounts an adjusting screw 176 adjacent the throttle connecting bar 158. The bracket 172 has a slot 178 extending downwardly from the top thereof to a circular aperture 180.

Following coupling of the engine 10 to the hedge trimmer 12 using the releasable coupling arrangement 14 in the manner previously described, the manually operated engine speed control 16 is releasably coupled to the carburetor 156 of the engine 10 by first placing the portion of the cable 106 between the metal bead 108 and the threaded collar 110 within the slot 166 in the post 164 and then pulling on the cable 106 so as to seat the metal bead 108 within the generally cylindrical aperture 168 in the side of the post 164. With the cable 106 so coupled to the post 164, the cable 106 is then pulled so as to rotate the throttle connecting bar 158 in the direction of the arrow 162 against the resistance of the carburetor valve return spring until the threaded collar 110 is positioned on the opposite side of the bracket 172 from the throttle connecting bar 158. The cable 106 is then passed through the slot 178 and into the circular aperture 180 of the bracket 172. Tension is then released allowing the threaded collar 110 to enter the circular aperture 180 and seat the self-locking nut 112 against the outside of the bracket 172.

The tension of the carburetor valve return spring within the carburetor 156 is sufficient to hold the fitting 28 consisting of the threaded color 110 and the self-locking nut 112 within the bracket 172 when the engine 10 is at idle or at an increased speed. When the engine 10 is at idle, the idle speed is adjusted by the screw on 176 which determines the idle position of the throttle connecting bar 158. The self-locking nut 112 is positioned along the length of the threaded collar 110 as necessary to assure that the metal bead 108 fits snuggly within the generally cylindrical aperture 168 in the post 164 when the engine 10 is at idle or at some increased speed. Thereafter, the speed of the engine 10 is controlled manually at the handle 20 by manipulation of the pivotally mounted button 18.

When the engine 10 is to be uncoupled from the hedge trimmer 12, the portion of the cable sheath 30 adjacent the threaded collar 110 is grasped and pulled so as to rotate the throttle connecting bar 158 in the direction of the arrow 162 against the resistance of the carburetor valve return spring. When the threaded collar 110 is removed from the circular aperture 180, the fitting 28 consisting of the threaded collar 110 and the self-locking nut 112 is moved upwardly so as to pass the cable 106 through the slot 178 in the bracket 172. With the cable 106 removed from the aperture 180 and the slot 178, tension is relaxed so as to allow the throttle connecting bar 158 to return to the idle position with the urging of the carburetor valve return spring. The metal bead 108 is then unseated from the generally cylindrical aperture 168 within the post 164 and the cable 106 is passed upwardly through the slot 166 in the post 164 so as to uncouple the cable 106 from the post 164.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An arrangement for releasably coupling an engine to a driven device comprising the combination of:
   an engine having a drive shaft and an ignition circuit having an electrical lead;
   a driven device having a driven shaft;
   means for releasably coupling the engine to the driven device so that the drive shaft is coupled to the driven shaft;
   a pressure-responsive electrical switch mounted on the engine and coupled to the electrical lead, the electrical switch being operative to ground the electrical lead except when held open; and
   a switch-engaging element mounted on the driven device and being operative to engage and hold open the pressure-responsive electrical switch when the engine is properly releasably coupled to the driven device, thereby permitting the engine to operate only when the engine is properly releasably coupled to the driven device.

2. The invention set forth in claim 1, wherein the means for releasably coupling provides for engagement by and rotation of the engine relative to the driven device into a proper releasably coupled position, and the switch-engaging element is positioned so as to be rotated into contact with the pressure-responsive electrical switch as the engine is rotated relative to the driven device into the proper releasably coupled position.

3. The invention set forth in claim 2, wherein the pressure-responsive electrical switch includes a housing, a conductive plunger slidably mounted within the housing and coupled to the electrical lead, a conductive element mounted on the plunger outside of the housing, a contact mounted on the housing adjacent the conductive element and coupled to electrical ground and a spring encircling the plunger within the housing, the spring normally urging the plunger in a direction to move the conductive element against the contact except when the switch-engaging element is moved into contact with the conductive plunger.

4. The invention set forth in claim 3, wherein the switch-engaging element includes a housing and a conductive rod mounted within the housing and arranged to bear against the conductive plunger of the electrical switch when the engine is rotated relative to the driven device into the proper releasably coupled position, and further including a switch and means coupling the conductive rod to electrical ground through the switch.

5. An arrangement for releasably coupling an engine to a driven device comprising the combination of:
   an engine having a drive shaft;
   a driven device having a driven shaft;
   means for releasably coupling the engine to the driven device so that the drive shaft is coupled to the driven shaft, the means for releasably coupling including a pair of coupling arrangements, one of which is mounted on the engine adjacent the drive shaft, and the other of which is mounted on the driven device adjacent the driven shaft, a first one of the pair of coupling arrangements including a generally ring-shaped element having a plurality of lugs mounted thereon, each of the lugs extending outwardly from the ring-shaped element and terminating in an enlarged head, a second one of the pair of coupling arrangements including a generally ring-shaped element having a plurality of apertures therein, each of the apertures having a width which varies in a given circumferential direction around the ring-shaped element from a portion of maximum width which is large enough to receive the enlarged head of a lug therethrough to a portion of minimum width; and a generally ring-shaped spring plate mounted on the ring-shaped element of the first coupling arrangement, the ring-shaped spring plate being of slightly non-planar configuration and of resilient material so as to exert pressure on the ring-shaped element of the second coupling arrangement when the lugs reside within the apertures in the ring-shaped element of the second coupling arrangement.

6. An arrangement for releasably coupling an engine to a driven device comprising the combination of:
an engine having a drive shaft;
a driven device having a driven shaft;
means for releasably coupling the engine to the driven device so that the drive shaft is coupled to the driven shaft, the means for releasably coupling including a pair of coupling arrangements, one of which is mounted on the engine adjacent the drive shaft, and the other of which is mounted on the driven device adjacent the driven shaft, a first one of the pair of coupling arrangements including a generally ring-shaped element having a plurality of lugs mounted thereon, each of the lugs extending outwardly from the ring-shaped element and terminating in an enlarged head, a second one of the pair of coupling arrangements including a generally ring-shaped element having a plurality of apertures therein, each of the apertures having a width which varies in a given circumferential direction around the ring-shaped element from a portion of maximum width which is large enough to receive the enlarged head of a lug therethrough to a portion of minimum width; and
a resilient retainer strip mounted on the ring-shaped element of the second coupling arrangement adjacent one of the apertures therein, the resilient retainer strip being operative to engage and lock the enlarged head of the lug within the portion of minimum width of the aperture.

7. An arrangement for releasably coupling an engine to a driven device comprising the combination of:
an engine having a drive shaft;
a driven device having a driven shaft;
means for releasably coupling the engine to the driven device so that the drive shaft is coupled to the driven shaft, the means for releasably coupling including a pair of coupling arrangements, one of which is mounted on the engine adjacent the drive shaft, and the other of which is mounted on the driven device adjacent the driven shaft, a first one of the pair of coupling arrangements including a generally ring-shaped element having a plurality of lugs mounted thereon, each of the lugs extending outwardly from the ring-shaped element and terminating in an enlarged head, a second one of the pair of coupling arrangements including a generally ring-shaped element having a plurality of apertures therein, each of the apertures having a width which varies in a given circumferential direction around the ring-shaped element from a portion of maximum width which is large enough to receive the enlarged head of a lug therethrough to a portion of minimum width; and
a pressure-responsive engine cut-off switch mounted on the ring-shaped element of the first coupling arrangement; and
a switch engaging element mounted on the ring-shaped element of the second coupling arrangement.

8. An arrangement for releasably coupling an engine to a driven device, comprising the combination of:
an engine having a drive shaft with an outer end;
a shaft coupling member at the outer end of the drive shaft;
a driven device having a driven shaft with an outer end;
an arrangement at the outer end of the driven shaft for receiving the shaft coupling member;
a lug-bearing ring mounted on the engine and encircling the shaft coupling member;
a plurality of lugs mounted in spaced-apart relation around the lug-bearing ring, each of the lugs extending outwardly from the lug-bearing ring and terminating in an enlarged head;
a lug-receiving ring mounted on the driven device and encircling the arrangement for receiving the shaft coupling member, the lug-receiving ring having a plurality of apertures disposed in spaced-apart relation around the lug-receiving ring, each of the apertures being adapted to receive a different one of the lugs therein and having a width which varies in a given circumferential direction around the lug-receiving ring from a portion of maximum width capable of receiving the enlarged head of the lug therethrough to a portion of minimum width for securing the enlarged head thereagainst, the lug-receiving ring having a front surface adapted to receive the lug-bearing ring and an opposite back surface; and
a resilient retainer strip mounted on the back surface of the lug-receiving ring so as to extend over the portion of maximum width of one of the apertures, the retainer strip having a manually actuable tab extending outwardly from the lug-receiving ring and operative to pull the retainer strip away from the back surface of the lug-receiving ring in the region of the aperture when manually actuated.

9. An arrangement for releasably coupling an engine to a driven device, comprising the combination of:
an engine having a drive shaft with an outer end;
a shaft coupling member at the outer end of the drive shaft;
a driven device having a driven shaft with an outer end;
an arrangement at the outer end of the driven shaft for receiving the shaft coupling member;
a lug-bearing ring mounted on the engine and encircling the shaft coupling member;
a plurality of lugs mounted in spaced-apart relation around the lug-bearing ring, each of the lugs extending outwardly from the lug-bearing ring and terminating in an enlarged head;
a lug-receiving ring mounted on the driven device and encircling the arrangement for receiving the shaft coupling member, the lug-receiving ring having a plurality of apertures disposed in spaced-apart relation around the lug-receiving ring, each of the apertures being adapted to receive a different one of the lugs therein and having a width which varies in a given circumferential direction around the lug-receiving ring from a portion of maximum width capable of receiving the enlarged head of the lug therethrough to a portion of minimum width for securing the enlarged head thereagainst; and
a ring-shaped spring plate mounted on the lug-bearing ring, the spring place being comprised of thin, resilient material and extending outwardly from the lug-bearing ring between adjacent pairs of the lugs.

* * * * *